(12) United States Patent
Hirose et al.

(10) Patent No.: US 10,845,739 B2
(45) Date of Patent: Nov. 24, 2020

(54) MANUFACTURING METHOD AND MANUFACTURING DEVICE FOR PEELING MEMBER

(71) Applicant: NTN CORPORATION, Osaka (JP)

(72) Inventors: Kazuo Hirose, Mie (JP); Hiroshi Yanagawa, Mie (JP)

(73) Assignee: NTN CORPORATION, Osaka (JP)

( * ) Notice: Subject to any disclaimer, the term of this patent is extended or adjusted under 35 U.S.C. 154(b) by 425 days.

(21) Appl. No.: 15/761,412

(22) PCT Filed: Sep. 16, 2016

(86) PCT No.: PCT/JP2016/077583
§ 371 (c)(1),
(2) Date: Mar. 19, 2018

(87) PCT Pub. No.: WO2017/047801
PCT Pub. Date: Mar. 23, 2017

(65) Prior Publication Data
US 2020/0241451 A1    Jul. 30, 2020

(30) Foreign Application Priority Data

Sep. 17, 2015 (JP) ................................. 2015-184370
Sep. 28, 2015 (JP) ................................. 2015-190424

(51) Int. Cl.
*G03G 15/20* (2006.01)
*B65H 5/06* (2006.01)
(Continued)

(52) U.S. Cl.
CPC ....... *G03G 15/2028* (2013.01); *B29C 53/043* (2013.01); *B29C 66/45* (2013.01);
(Continued)

(58) Field of Classification Search
None
See application file for complete search history.

(56) References Cited

U.S. PATENT DOCUMENTS 4,065,333 A * 12/1977 Lawlis ................... B24B 9/002
156/40
4,588,463 A *  5/1986 Barber ................. B31F 1/0029
156/200
(Continued)

FOREIGN PATENT DOCUMENTS

CN      1621962 A    6/2005
JP   2001-235959 A    8/2001
(Continued)

OTHER PUBLICATIONS

International Search Report for PCT/JP2016/077583 dated Nov. 22, 2016.
(Continued)

*Primary Examiner* — Barbara J Musser
(74) *Attorney, Agent, or Firm* — Hedman & Costigan, P.C.; James V. Costigan; Kathleen A. Costigan

(57) ABSTRACT

To provide a manufacturing method and a manufacturing device for a peeling member capable of manufacturing the peeling member having less variation in quality and excellent durability for long-time use at a low cost with excellent productivity by a simple structure. The manufacturing method for the peeling member includes sticking a non-adhesive resin film. In sticking the non-adhesive resin film, a distal end edge 2b of a distal end portion 2a of a base material 2 is arranged at a side of an adhesive layer of a non-adhesive resin film 4 such that an end portion of the non-adhesive resin film 4 is protruded from the distal end edge 2b, and then the non-adhesive resin film 4 is stuck on both surfaces of the distal end portion 2a of a base material 2 to wrap the distal end edge 2b of the base material 2 by (Continued)

pressing a plurality rollers 21 to 25 sequentially onto the non-adhesive resin film 4 from an one side end portion toward an another side end portion in a longitudinal direction of the base material 2.

8 Claims, 9 Drawing Sheets

(51) Int. Cl.
  *B65H 37/06* (2006.01)
  *B29C 65/00* (2006.01)
  *B29C 53/04* (2006.01)

(52) U.S. Cl.
  CPC .. *B29C 66/81463* (2013.01); *B29C 66/81467* (2013.01); *B65H 5/06* (2013.01); *B65H 37/06* (2013.01); *Y10T 156/1034* (2015.01)

(56) References Cited

U.S. PATENT DOCUMENTS

2005/0117941 A1 6/2005 Ohta
2008/0276440 A1 11/2008 Ohta

FOREIGN PATENT DOCUMENTS

JP 2003-122174 A 4/2003
JP 2005-181999 A 7/2005

OTHER PUBLICATIONS

International Preliminary Report on Patentability dated Mar. 20, 2018.
English Abstract for JP 2001-235959 A dated Aug. 31, 2001.
English Abstract for JP 2003-122174 A dated Apr. 25, 2003.
English Abstract for JP 2005-181999 A dated Jul. 7, 2005.
English Abstract for CN 1621962 A dated Jun. 1, 2005.

* cited by examiner (A)

(B)

(a)

(b)

(c)

(d)

(a)

(b)

MANUFACTURING METHOD AND MANUFACTURING DEVICE FOR PEELING MEMBER

TECHNICAL FIELD

The present invention relates to a manufacturing method and a manufacturing device for a peeling member that peels a paper from a fixing member such as a fixing roller and a fixing belt arranged in an electronic photographic device such as a copying machine and a laser printer.

BACKGROUND ART

In an electronic photographic device such as a copying machine and a laser printer, a thermal fixing device that develops an electrostatic latent image, which is formed on a photoreceptor drum, on a paper by using a developing agent such as toner and then fixes the developed image is arranged. The thermal fixing device is provided with a fixing member such as a fixing roller and a fixing belt for fixing the developing agent on a paper by heating and melting and pressing the developing agent.

In the fixing member or a pressing roller that presses the fixing member against a paper, a sheet-like peeling member that peels a paper on which the developing agent is fixed from the roller or the like is used in order to prevent the paper from winding around the roller and interrupting smooth operation of the roller. For example, in a peeling member disclosed in Patent Document 1, a fluororesin film is folded and stuck to a distal end portion of a metal plate via a silicon adhesive, and a distal end of the film is arranged adjacent to an outer circumference surface of the roller so as to scoop an edge of the paper so that the paper is prevented from winding around the roller.

A manufacturing method for such a peeling member in which the fluororesin film is stuck is proposed in Patent Document 2. In Patent Document 2, in order to obtain a peeling member in which existence of a crinkle or an air bubble in the fluororesin film is suppressed as much as possible, the fluororesin film is arranged to interpose an edge and a peripheral portion around the edge of a base material such that the edge of one side of the base material having a plate shape is wrapped and a pulled portion is formed at both ends of the fluororesin film with respect to the one side of the edge, and then the fluororesin film is stuck to the base material by pressing the fluororesin film with the portion of the base material interposed between the fluororesin films in a state in which tensile force generated by pulling the both ends of the pulled portion is applied to the fluororesin film.

However, in the peeling member obtained by this method, since the fluororesin film is stuck while applying the tensile force, in a case in which the adhesive force is deteriorated in long-time use, the fluororesin film is contracted and therefore a paper might get dirt due to the toner stuck to the expose adhesive.

Against this, in Patent Document 3, a manufacturing method in which a fluororesin film is stuck to a base material in a state in which tensile force is not applied to the fluororesin film is proposed. However, according to this method, it is necessary to use an automatic sticking machine having an expensive and large structure. Further, in a case in which an uneven shape such as a projection is formed on a stuck surface, the sticking of the fluororesin film is impossible, and therefor design of the peeling member is partially restricted.

PRIOR ART DOCUMENTS

Patent Documents

Patent Document 1: JP 2001-235959 A
Patent Document 2: JP 2003-122174 A
Patent Document 3: JP 2005-181999 A

SUMMARY OF THE INVENTION

Problems to be Solved by the Invention

A fixing member shows excellent fixing properties by using a peeling member in which a fluororesin film is stuck, however each of the conventional manufacturing techniques has the problem described above, and therefore further improvement of the manufacturing method or the manufacturing device is desired.

An object of the present invention is, in order to solve such a problem, to provide a manufacturing method and a manufacturing device for a peeling member capable of manufacturing the peeling member having less variation in quality and excellent durability for long time use at a low cost with excellent productivity by a simple structure.

Means for Solving the Problem

A manufacturing method for a peeling member of the present invention is a manufacturing method for a peeling member provided with a peeling sheet formed by a base material formed of a metal plate or a resin plate and a non-adhesive resin film stuck to the base material. The peeling member is formed to peel a paper from a fixing member of an electronic photographic device by making a distal end portion of the peeling sheet, which is an end portion of a long side of the peeling sheet at an upstream side in a paper passing direction, contact with or close to the fixing member. The manufacturing method for the peeling member includes sticking the non-adhesive resin film, which has an adhesive layer on a surface at a side opposite to a paper passing side, to a distal end portion of the base material corresponding to the distal end portion of the peeling sheet. In sticking the non-adhesive resin film, a distal end edge of the distal end edge of the distal end portion of the base material is arranged at a side of the adhesive layer of the non-adhesive resin film such that the end portion of the non-adhesive resin film is protruded from the distal end edge, and then the non-adhesive resin film on both surfaces of the distal end portion of the base material to wrap the distal end edge of the base material by pressing a plurality rollers sequentially onto the non-adhesive resin film from an one side end portion toward an another side end portion in a longitudinal direction of the base material.

Here, "contact with" means that one side (the distal end portion) of the peeing sheet is linearly contacted with the fixing member such as a roller in an axial direction. Further, "close to" means that the one side (the distal end portion) of the peeling sheet is arranged close to the roller such that a paper can be prevented from winding around the roller or the like. Further, the fixing member denotes a member formed in either of a roller-like shape, a film-like shape, or a belt-like shape capable of contacting with a paper in a step of heating and at the same time pressing an undeveloped developing agent on a paper so as to be fixed on the paper. For example, the fixing member includes a fixing roller, a pressing roller, and the like.

In sticking the non-adhesive resin, first to fifth rollers as the rollers may be sequentially used to perform that (1) the first roller folds the non-adhesive resin film at an angle equal to or more than 10° and less than 50° against a surface of the base material, (2) the second roller folds the non-adhesive resin film at an angle equal to or more than 50° and less than 85° against the surface of the base material, (3) the third roller folds the non-adhesive resin film at an angle equal to or more than 100° and less than 165° against the surface of the base material to wrap the distal end edge of the base material, and (4) the fourth roller and the fifth roller interpose the distal end portion of the base material between them so that the non-adhesive resin film is stuck on the both surfaces of the distal end portion of the base material.

A manufacturing device for a peeling member of the present invention is a manufacturing device for a peeling member provided with a peeling sheet formed by a base material formed of a metal plate or a resin plate and a non-adhesive resin film stuck to the base material. The peeling member is formed to peel a paper from a fixing member of an electronic photographic device by making a distal end portion of the peeling sheet, which is an end portion of a long side of the peeling sheet at an upstream side in a paper passing direction, contact with or close to the fixing member. The manufacturing device for the peeling member includes a film sticking unit that sticks the non-adhesive resin film, which includes an adhesive layer on a surface at a side opposite to a paper passing side, to a distal end portion of the base material corresponding to the distal end portion of the peeling sheet. The film sticking unit includes a plurality of rollers and a moving unit that moves the rollers relatively to the base material. The moving unit is formed to move the rollers relatively to the base material, which has the non-adhesive resin film stuck on one surface of the base material via an adhesive layer such that an end portion of the non-adhesive resin film is protruded from a distal end edge of the distal end portion of the base material, from an one side end portion toward an another side end portion in a longitudinal direction of the base material. The rollers are sequentially arranged along a moving direction of the rollers moved by the moving unit, and the rollers includes a plurality of the rollers for folding arranged to be inclined such that angles of surfaces of the rollers to the one surface of the base material are set to be gradually larger from an upstream side in the moving direction and a pair of the rollers for finishing arranged to interpose the base material from both surface sides and follow a plurality of the rollers for folding. The manufacturing device for the peeling member is formed to use the moving unit to stick the non-adhesive resin film on both surfaces of the distal end portion of the base material to wrap a distal end edge of the base material by pressing the rollers for folding sequentially onto the non-adhesive resin film and interposing the base material from both surface sides by the rollers for finishing.

The film sticking unit may include first to third rollers as the rollers for folding, and fourth and fifth rollers as the rollers for finishing. In a section orthogonal to the moving direction of the rollers moved by the moving unit, the first roller may be inclined at an angle equal to or more than 10° and less than 50°, the second roller may be inclined at an angle equal to or more than 50° and less than 85°, and the third roller may be inclined at an angle equal to or more than 100° and less than 165° against the one surface of the base material, and the fourth and fifth rollers may be parallel to the surface of the base material.

Each of the rollers of the manufacturing method or the manufacturing device may include a roller body and a roller shaft that supports the roller body in a rolling manner, and the roller body may be formed of a rubber material, a foaming material, or a resin material. Further, the hardness of the roller body may be set in a range between the Shore A10 hardness and the Shore A90 hardness. The Shore A hardness denotes durometer A hardness according to JIS K6253.

Effect of the Invention

The manufacturing method for the peeling member of the present invention includes sticking the non-adhesive resin film. In sticking the non-adhesive resin film, the distal end edge of the distal end portion of the base material is arranged at the side of the adhesive layer of the non-adhesive resin film such that the end portion of the non-adhesive resin film is protruded from the distal end edge, and then the non-adhesive resin film is stuck on both surfaces of the distal end portion of the base material to wrap the distal end edge of the base material by pressing a plurality rollers sequentially onto the non-adhesive resin film from an one side end portion toward an another side end portion in a longitudinal direction of the base material after. Consequently, the non-adhesive resin film can be stuck while suppressing generation of a crinkle or an air bubble in the non-adhesive resin film, and therefore the peeling members with less variation in quality can be obtained. Further, since the tensile force is not applied to the non-adhesive resin film in sticking, the resin film is not contracted in the obtained peeling member, and thereby the peeling member can endure long-time use. Accordingly, toner soiling to a paper can be prevented for a long period of time, and therefore high quality record image can be continuously obtained. Further, even if a projection is formed on the stuck surface, the non-adhesive resin film can be stuck.

Further, the roller device used in sticking has a simple structure provided with a roller, a linear guide and the like, and therefore a cost of the device can be suppressed. Further, by moving a roller group from one end portion to another end portion, the non-adhesive resin film can be stuck (folded), and thereby the peeling member can be mass-manufactured in a short time.

In the manufacturing device for the peeling member of the present invention, the film sticking unit includes a plurality of the rollers and the moving unit that moves the rollers relatively to the base material. The rollers are sequentially arranged along the moving direction of the rollers moved by the moving unit, and the rollers includes a plurality of the rollers for folding arranged to be inclined such that angles of surfaces of the rollers against the one surface of the base material are set to gradually larger from the upstream side in the moving direction and a pair of the rollers for finishing arranged to interpose the base material from both surface sides and to follow a plurality of the rollers for folding Further, the manufacturing device for the peeling member is formed use the moving unit to stick the non-adhesive resin film on both surfaces of the distal end portion of the base material to wrap the distal end edge of the base material by pressing the rollers for folding sequentially onto the non-adhesive resin film and interposing the base material from both surface sides by the rollers for finishing. Consequently, the non-adhesive resin film can be stuck while suppressing generation of a crinkle or an air bubble in the non-adhesive resin film, and therefore, similar to the manufacturing method, the peeling members having excellent properties with less variation in quality can be obtained.

Further, the film sticking unit has a simple structure provided with a plurality of the rollers and the moving unit, and therefore a cost of the device can be suppressed. Further, by moving a roller group from one end portion to another end portion, the non-adhesive resin film can be stuck (folded), and thereby the peeling member can be mass-manufactured in a short time.

MODE FOR CARRYING OUT THE INVENTION

Figure 6:
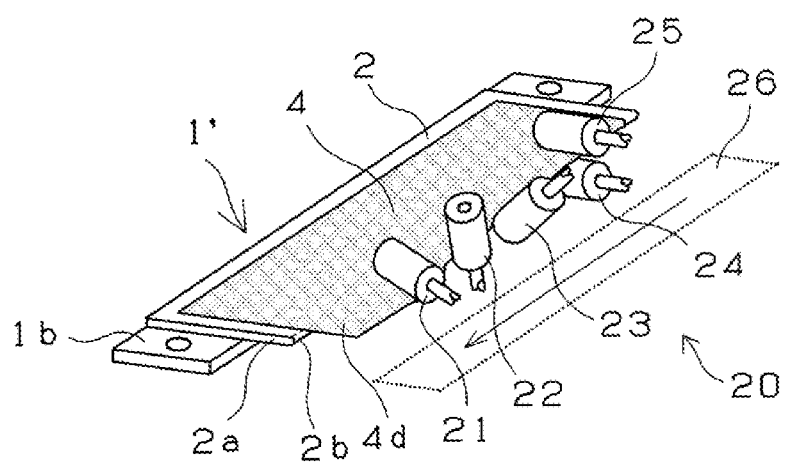
FIG. 6 is a view illustrating a film sticking unit in a manufacturing device of the present invention.

A manufacturing device for a peeling member of the present invention is formed to manufacture the peeling member provided with a peeling sheet having a base material and a non-adhesive resin film stuck to the base material. In particular, the manufacturing device has a feature in a film sticking unit for sticking the resin film in the peeling sheet. The manufacturing device is used in, for example, a manufacturing method for a peeling member of the present invention described below. FIG. 6 shows the film sticking unit in the manufacturing device. As shown in FIG. 6, a roller device 20 as the film sticking unit is provided for sticking a non-adhesive resin film 4 on both surfaces of a distal end portion 2a of a base material 2, against a base material (composite material 1') having the non-adhesive resin film 4 stuck to one surface of the base material 2 such that an end portion of the non-adhesive resin film 4 is protruded from a distal end edge 2b of the distal end portion 2a of the base material 2. The non-adhesive resin film 4 is stuck on both surfaces of the distal end portion 2a by pressing a plurality of rollers sequentially on the protruded non-adhesive resin film 4 from one end portion toward another end portion in a longitudinal direction of the base material 2 so that the distal end edge 2b of the base material 2 is sequentially wrapped by the non-adhesive resin film 4.

The roller device 20 as the film sticking unit is provided with five rollers 21 to 25, and a linear guide 26 as a moving unit that moves those rollers against the base material 2. The linear guide 26 is formed to move a whole of a roller group formed by the rollers 21 to 25 from one end portion (upper side in the figure) toward another end portion (lower side in figure) in the longitudinal direction of the base material 2. Each roller is formed by a roller body having a cylindrical shape, and a roller shaft arranged on a center axis of the cylindrical shape of the roller body so as to support the roller body in a rolling manner.

The roller 21 to the roller 23 are arranged in series with a predetermined interval in this order from an upstream side in a moving direction of the roller group moved by the linear guide 26, and the roller 24 and the roller 25 are arranged in parallel with an interval at a position having a predetermined interval from the roller 23 in series. The roller group is supported integrally by the linear guide 26, and therefore a positional relation (roller interval or the like) between the rollers is not changed in moving of the roller group. Further, the moving unit is not limited to the linear guide, and any unit that can move the roller group as described above may be adopted.

Three rollers of the first roller 21 to the third roller 23 are used for folding the non-adhesive resin film, and a pair of rollers of the fourth roller 24 and the fifth roller 25 is used for finishing the sticking of the non-adhesive resin film. Each roller has a different angle (hereinafter, referred merely to as "inclined angle") between a surface (cylindrical surface) of the roller body and an upper surface (surface on which the non-adhesive resin film is stuck) of the base material 2. In the present embodiment, the roller body is formed in a cylindrical shape and the roller shaft is arranged on the center axis of the cylindrical shape, and thereby the inclined angle described above is equal to an angle between the upper surface of the base material 2 and the roller shaft.

Since the rollers 21 to 23 for folding are formed to fold the non-adhesive resin film 4 gradually, the inclined angles of the rollers 21 to 23 are set to be gradually larger from the upstream side in the moving direction of the linear guide 26 as a moving unit. For example, the first roller 21 is inclined against the upper surface of the base material 2 at an angle equal to or more than 10° and less than 50°. The second roller 22 is inclined against the upper surface of the base material 2 at an angle equal to or more than 50° and less than 85°. The third roller 23 is inclined against the upper surface of the base material 2 at an angle equal to or more than 100° and less than 165°.

Preferred ranges of the inclined angles of the rollers 21 to 23 for folding are a range between 10° and 30° for the first roller 21, a range between 50° and 80° for the second roller 22, and a range 130° and 160° for the third roller 23. By setting the inclined angles in such ranges, the non-adhesive resin film can be further neatly stuck.

Each of the roller 24 and the roller 25 for finishing is parallel to the upper surface of the base material 2. The fourth roller 24 is arranged in a lower space with respect to the base material, and the fifth roller 25 is arranged in an upper space with respect to the base material. The non-adhesive resin film 4 is pressed and stuck on the both surfaces of the distal end portion of the base material 2 by interposing the base material 2 from the both surfaces by using a pair of the roller 24 and the roller 25. In such an arrangement, each of the five rollers 21 to 25 contacts with the non-adhesive resin film 4, at the surface (cylindrical surface) of each roller body when sticking the non-adhesive resin film 4.

When the base material 2 is seen from an upper side, the roller shaft of each roller is orthogonal to or slightly inclined to a proceeding direction (direction along the distal end edge 2b of the base material 2). In the rollers 21 to 23 for folding, it is preferable that the roller shaft is slightly inclined (1° to 5°) against the proceeding direction such that a distal end side of the roller body is slightly antecedent in the proceeding direction.

The roller body of each roller is formed of a rubber material, a foaming material, or a resin material. The hardness of the roller body is preferably set in a range between the Shore A10 hardness and the Shore A90 hardness.

Further, in the hardness of the roller body of each roller, it is preferable that the first roller 21 is set to be soft, the second roller 22 is set to be hard, the third roller 23 is set to be soft, and the fourth roller and the fifth roller 25 are set to be hard. That is, the roller (the first roller 21) that is firstly led to the non-adhesive resin film and the roller (the third roller 23) that folds and bends the non-adhesive resin film largely at the distal end edge of the base material are set to be soft, and other rollers (the second roller 22, the fourth roller 24 and the fifth roller 25) that do not bend the non-adhesive resin film largely are set to be hard. With this combination, the non-adhesive resin film 4 can be neatly stuck on the base material 2 in a sticking step without generating a crinkle in the non-adhesive resin film 4 and without retaining an air bubble in the non-adhesive resin film 4. Further, it is preferable that the hardness of the roller body to be "soft" is set in a range between the Shore A10 hardness and the Shore A30 hardness, and the hardness of the roller to be "hard" is set in a range between the Shore A50 hardness and the Shore A90 hardness.

As described above, a configuration using the five rollers is described with reference to the drawings, however the manufacturing device and the manufacturing method of the present invention are not limited to this. However, it is preferable to arrange two or more rollers for folding.

Figure 1:
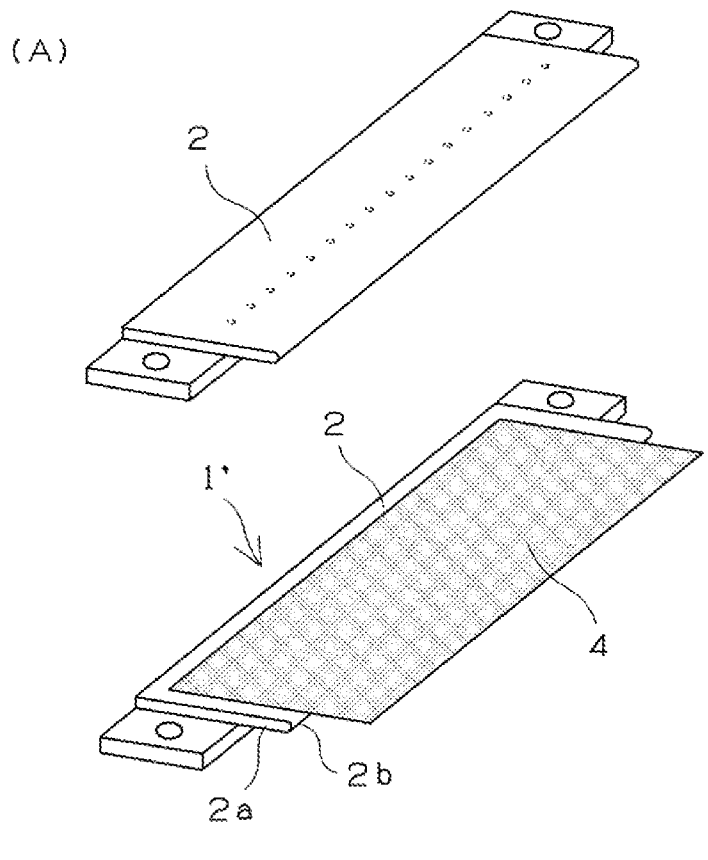
FIGS. 1(a) and 1(b) are schematic views of a manufacturing process of a peeling member of the present invention.
Figure 1:
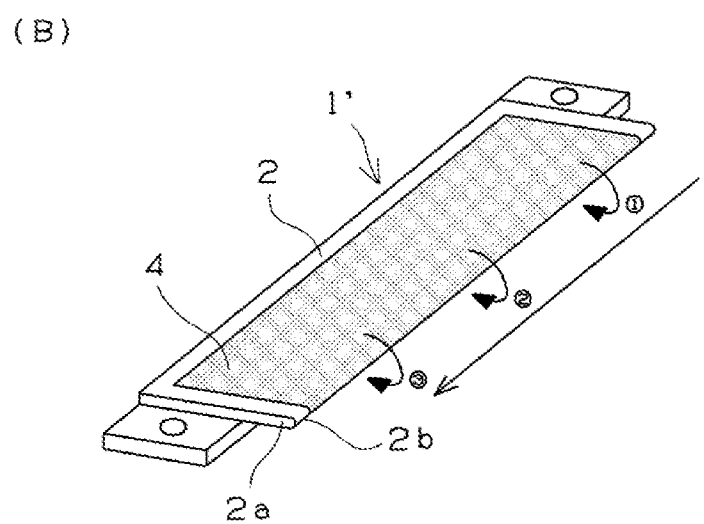

The manufacturing method for the peeling member of the present invention is for manufacturing the peeling member provided with the peeling sheet including the base material and the non-adhesive resin film stuck to the base material. In particular, a manufacturing process of the peeling member is characterized. FIGS. 1(a) and 1(b) show an outline of the manufacturing process. As shown in FIGS. 1(a) and 1(b), the manufacturing process includes (A) a preparing step before the manufacturing device is used, and (B) a film sticking step using the manufacturing device. Here, (A) the preparing step is formed to prepare the base material (composite material 1') having the non-adhesive resin film 4 stuck on one surface of the base material 2 via the adhesive layer such that the end portion of the non-adhesive resin film 4 is protruded from the distal end edge 2b of the distal end portion 2a of the base material 2. (B) the film sticking step is formed to stick the non-adhesive resin film 4 on both surfaces of the distal end portion 2a of the base material 2, against the base material (the composite material 1') prepared in the preparing step, such that the non-adhesive resin film 4 is stuck by pressing a plurality of rollers sequentially on the protruded non-adhesive resin film 4 from one end portion toward another end portion in the longitudinal direction of the base material 2 so that the distal end edge 2b of the base material 2 is sequentially wrapped by the non-adhesive resin film 4. Hereinafter, these steps are described with reference to FIG. 2 through FIGS. 7(a) to 7(d).

(A) Preparing Step

Figure 2:
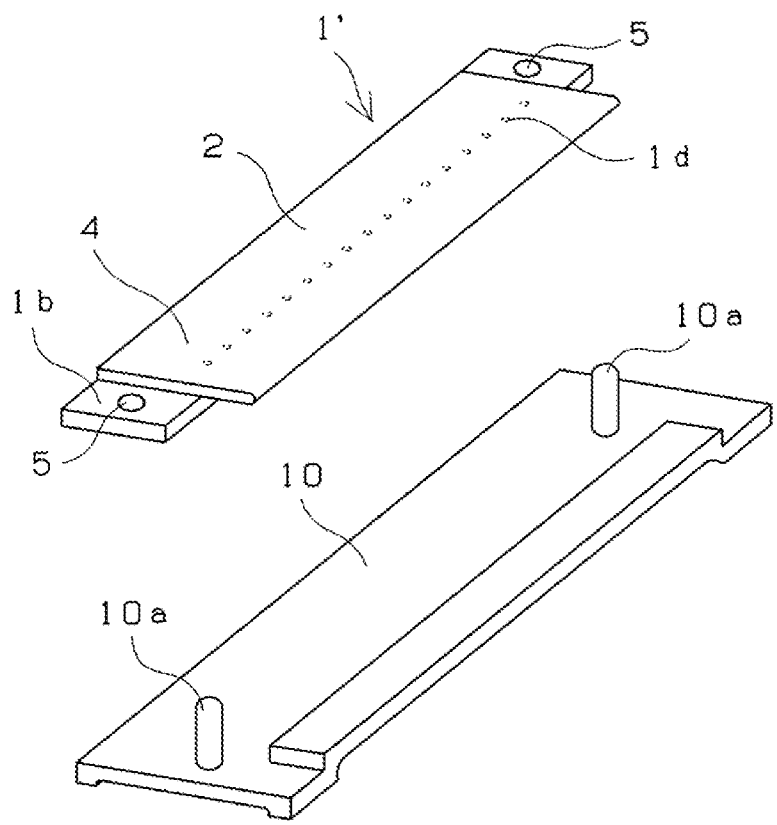
FIG. 2 is a view illustrating a procedure for fixing a base material or the like to a base.
Figure 2:
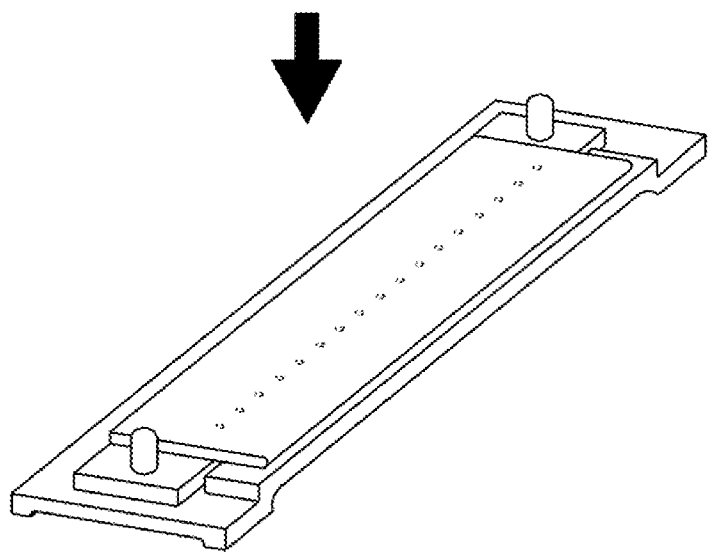
Figure 3:
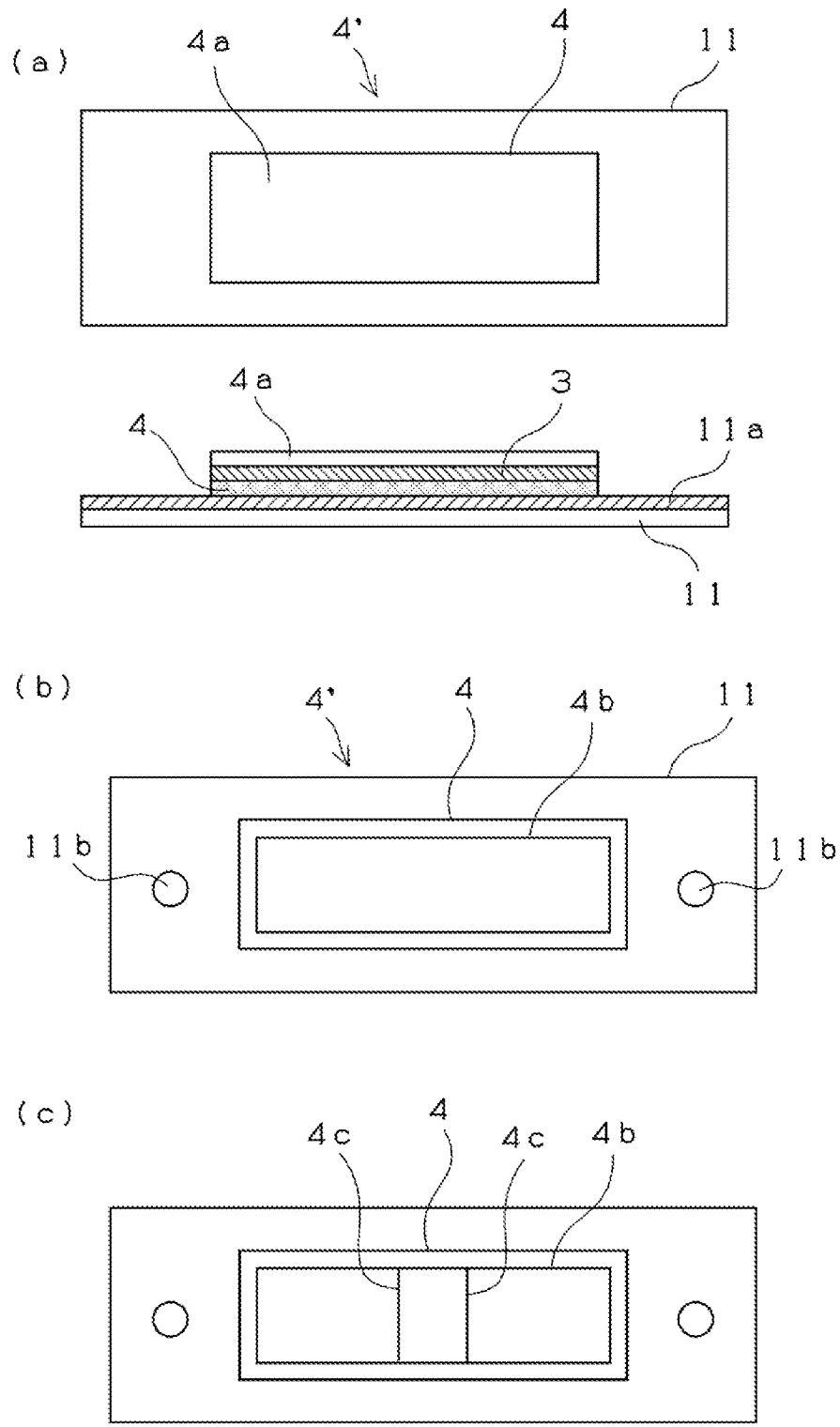
FIGS. 3(a) to 3(c) are views illustrating a procedure for cutting a non-adhesive resin film.

At first, as shown in FIG. 2, the composite material 1' in which the base material 2 is joined to a support member 1b by means of laser spot welding to remain a free end portion, is prepared. A reference numeral 1d is a mark of the laser spot welding. Next, two reference pins 10a of a base 10 that holds the composite material 1' are inserted into two holes 5 of the composite material 1'.

Figure 4:
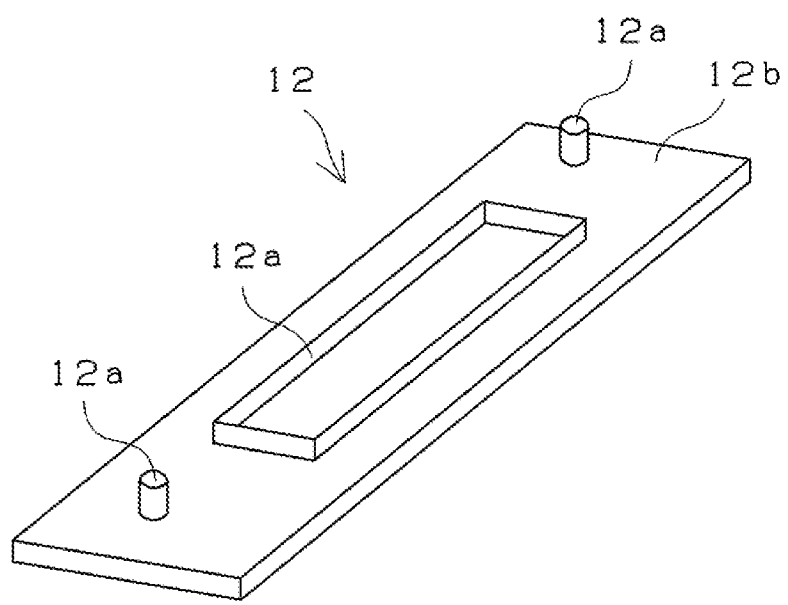
FIG. 4 is a view illustrating a cutting jig for the non-adhesive resin film.

As shown in FIG. 3(a), a composite film 4', which is formed by the non-adhesive resin film 4 having the silicon-based adhesive layer 3 on a surface opposite to a paper passing side to be a stuck surface to the base material and a carrier sheet 11 having an adhesive agent 11a, is prepared by sticking the carrier sheet 11 on the surface at the paper passing side of the non-adhesive resin film 4. A reference numeral 4a is a release paper. Here, in FIG. 3(a), an upper figure is a plane view, and a lower figure is a side view. Next, a cutting jig 12 as shown in FIG. 4 is prepared. In the cutting jig 12, the Thomson blade 12a is fixed on a wood frame 12b at a position corresponding to an outer circumference shape of the non-adhesive resin film to be stuck to the base material and positions corresponding to the reference pins of the base. As shown in FIG. 3(b), a cut 4b corresponding to the outer circumference shape of the non-adhesive resin film to be stuck to the base material is formed by cutting the release paper 4a and the non-adhesive resin film 4 from a side of the non-adhesive resin film 4 of the composite film 4' by using the cutting jig. At that time, the cut of the outer circumference shape is not made on the carrier sheet 11. Further, at the same time, reference holes 11b corresponding to the reference pins are formed in the carrier sheet 11. After that, as shown in FIG. 3(c), two cuts 4c are further made at a center portion of the non-adhesive resin film 4 of the composite film 4' having the cut.

Figure 5:
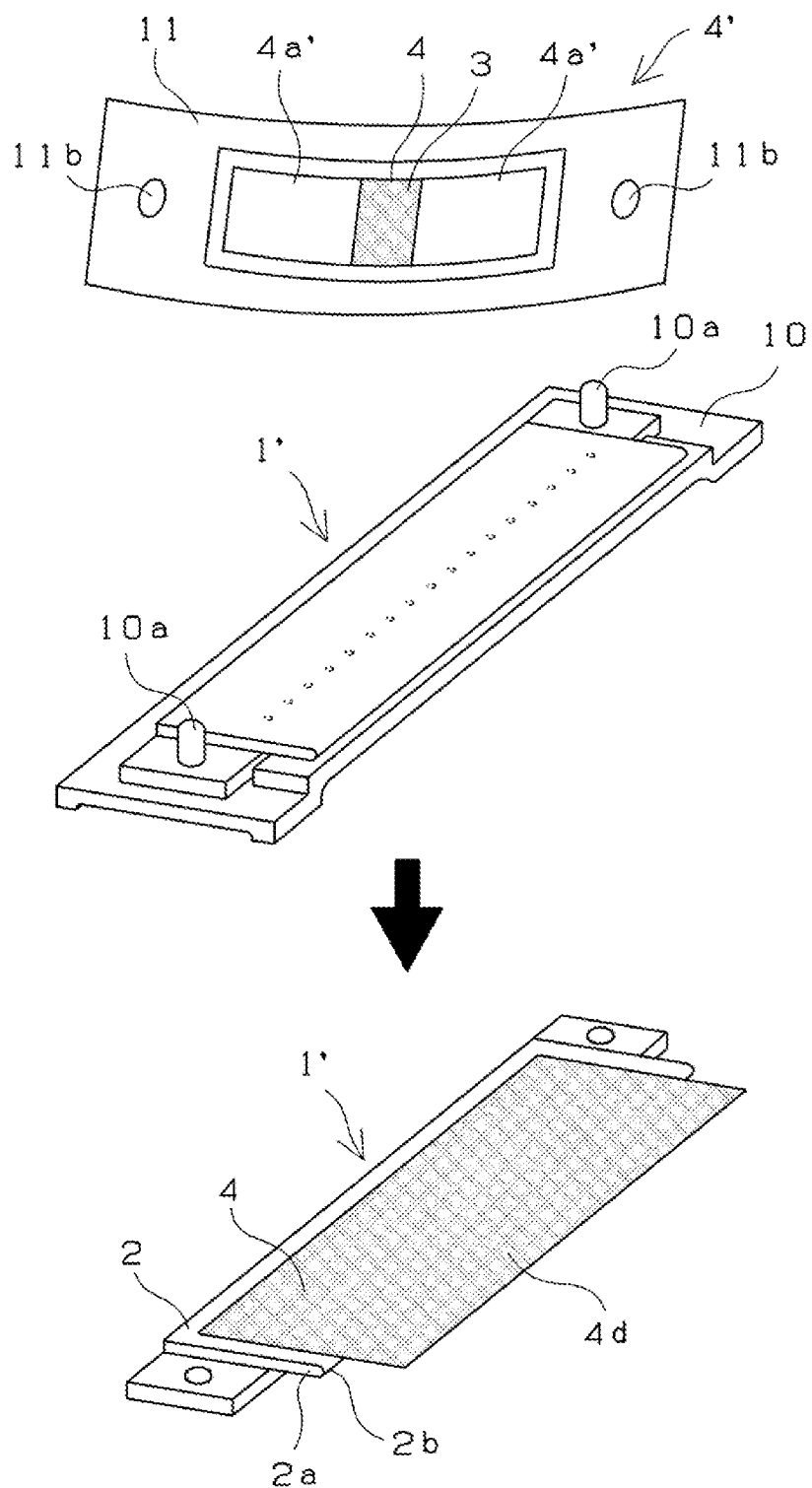
FIG. 5 is a view illustrating a procedure for sticking the non-adhesive resin film to the base material.

The release paper on the center portion of the composite film 4' is removed. As shown in FIG. 5, the composite film 4' having the cut is arranged on the composite material 1a' held by the base 10 such that the reference pins 10a of the base 10 are inserted into the reference holes 11b. At this time, the center portion of the composite film 4' is firstly stuck and fixed to the composite material 1a'. Next, the release papers 4a' at both sides of the center portion are removed, and the both sides of the center portion of the composite film 4' are stuck and fixed to the composite material 1a'. Next, the carrier sheet 11 of the composite film 4' on the base 10 is removed from the non-adhesive resin film 4, and then the composite material 1a' to which the non-adhesive resin film 4 is stuck is released from the base 10.

With such a preparing step, the base material (the composite material 1') having the non-adhesive resin film 4 stuck to one surface of the base material via the adhesive layer such that the end portion of the non-adhesive resin film 4 is protruded from the distal end edge 2b of the distal end 2a of the base material 2 is obtained. A protruded portion 4d of the non-adhesive resin film 4 is non-stuck portion against the base material 2.

Further, other known method may be adopted as the preparing step as long as the base material (the composite material 1') described above can be prepared. In a case in which a material being weak in stiffness is used as the non-adhesive resin film 4 or in a case in which a recessed shape is formed on a surface of the film, it is especially preferable to adopt the preparing step as shown in FIG. 2 through FIG. 5.

(B) Film Sticking Step

A film sticking step is described with reference to FIG. 6 and FIGS. 7(a) to 7(d). In the film sticking step, for example, the manufacturing device for the peeling member of the present invention described above is used. As shown in FIG. 6, the rollers 21 to 25 of the roller device 20 as a film sticking unit are introduced to the base material (the composite material 1') having the non-adhesive resin film 4 stuck to the one surface of the base material 2 via the adhesive layer, from the roller 21 as the lead toward the end portion at one side (an upper side in the figure) in the longitudinal direction of the base material 2. And then, the roller group is moved in a direction parallel to the distal end edge 2b. The moving of the roller group is performed by the linear guide 26 as a moving unit. With this, the rollers 21, 22, 23, and a group of the rollers 24, 25 are introduced in this order to the end portion at the one side (the upper side in the figure) in the longitudinal direction of the base material 2. The rollers 21 to 23 for folding proceeds while gradually folding the non-adhesive resin film 4 in a direction from an upper surface to a lower surface of the base material 2 in accordance with the inclined angles of the rollers, and following this, the roller 24 and the roller 25 proceed toward an end portion at another side (the lower side in the figure) of the base material 2 while pressing the base material 2 from respective sides of the lower surface and the upper surface. With this, the non-adhesive resin film is stuck to the both surfaces of the distal end of the base material so as to wrap the distal end edge of the base material.

Figure 7:
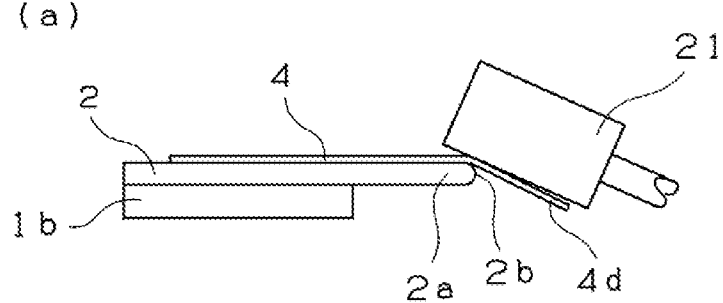
FIGS. 7(a) to 7(d) are views illustrating a sticking step performed by the film sticking unit.
Figure 7:
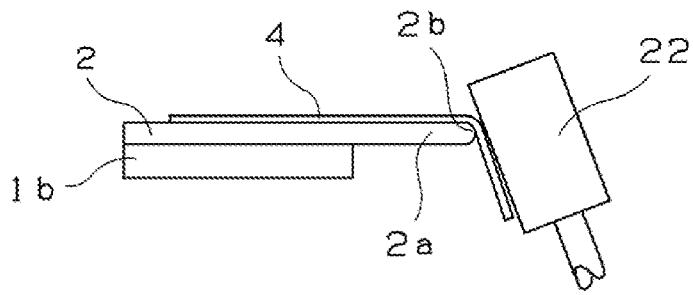
Figure 7:
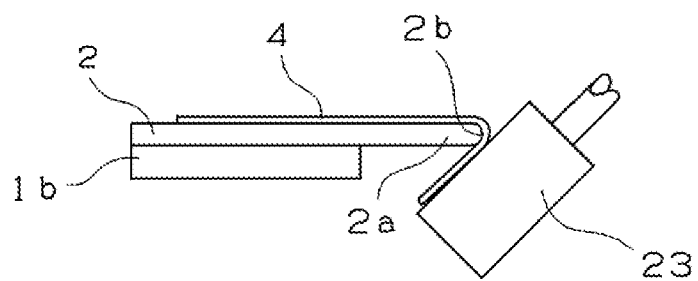
Figure 7:
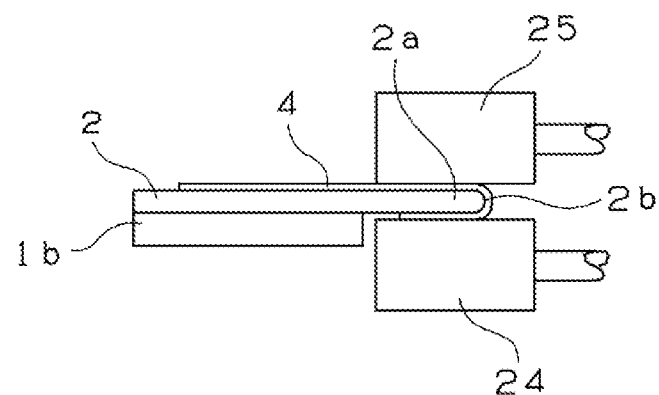

More specifically, as shown in FIG. 6 and FIGS. 7(*a*) to 7(*d*), the protruded portion 4*d* of the non-adhesive resin film 4 protruded from the distal end edge 2*b* of the base material 2 is processed, from one end portion of the distal end edge 2*b*, such that (1) the first roller 21 folds the non-adhesive resin film 4 at an angle equal to or more than 10° and less than 50° against the upper surface of the base material 2 (FIG. 7(*a*)), and (2) the second roller 22 folds the non-adhesive resin film 4 at an angle equal to or more than 50° and less than 85° against the upper surface of the base material 2 (FIG. 7(*b*)), and (3) the third roller 23 folds the non-adhesive resin film 4 at an angle equal to or more than 100° and less than 165° against the upper surface of the base material 2, so as to wrap the distal end edge 2*b* of the base material 2 (FIG. 7(*c*)), and then (4) the fourth roller 24 and the fifth roller 25 interpose the distal end portion 2*a* of the base material 2 between them so as to stick and fix the non-adhesive resin film 4 (FIG. 7(*d*)). The sticking of (4) is performed to extrude an air bubble included between the base material 2 and the non-adhesive resin film 4. Further, the roller 24 and the roller 25 press the non-adhesive resin film 4 to another end portion, and when the roller 24 and the roller 25 exceed another end portion, the sticking operation of the non-adhesive resin film 4 to the base material 2 is completed, and thereby a peeling member 1 shown in FIG. 6 is obtained.

As more preferable manufacturing process, in steps (1) to (3) described above, (1) the non-adhesive resin film 4 is folded by the first roller 21 at the angle equal to or more than 10° and not more than 30° against the upper surface of the base material 2, and (2) the non-adhesive resin film 4 is folded by the second roller 22 at an angle equal to or more than 50° and not more than 80° against the upper surface of the base material 2, and (3) the non-adhesive resin film 4 is folded by the third roller 23 at an angle equal to or more than 130° and not more than 160° against the upper surface of the base material 2, so as to wrap the distal end edge 2*b* of the base material 2. By sequentially folding the non-adhesive resin film 4 at such angles, the non-adhesive resin film can be further neatly stuck.

Further, it is preferable that the composite material 1' is initially arranged such that the surface on which the non-adhesive resin film 4 is stuck is located at an upper side in a vertical direction. The protruded portion 4*d* of the non-adhesive resin film 4 is kept horizontally due to the stiffness of the non-adhesive resin film itself, however when the non-adhesive resin film is slightly curved by its dead weight in a wrapping direction, the first roller 21 is smoothly introduced.

It is difficult to stick the non-adhesive resin film to wrap the distal end edge of the base material without generating a crinkle or an air bubble. By using the manufacturing method or the manufacturing device for the peeling member of the present invention, the non-adhesive resin film can be stuck to the base material by folding and pressing performed by the film sticking unit described above (continuous roller group) without generating a crinkle or an air bubble. Further, it is not necessary to apply tensile force to the non-adhesive resin film in sticking. Accordingly, the obtained peeling member can prevent a paper from getting dirt by toner for a long time.

Figure 8:
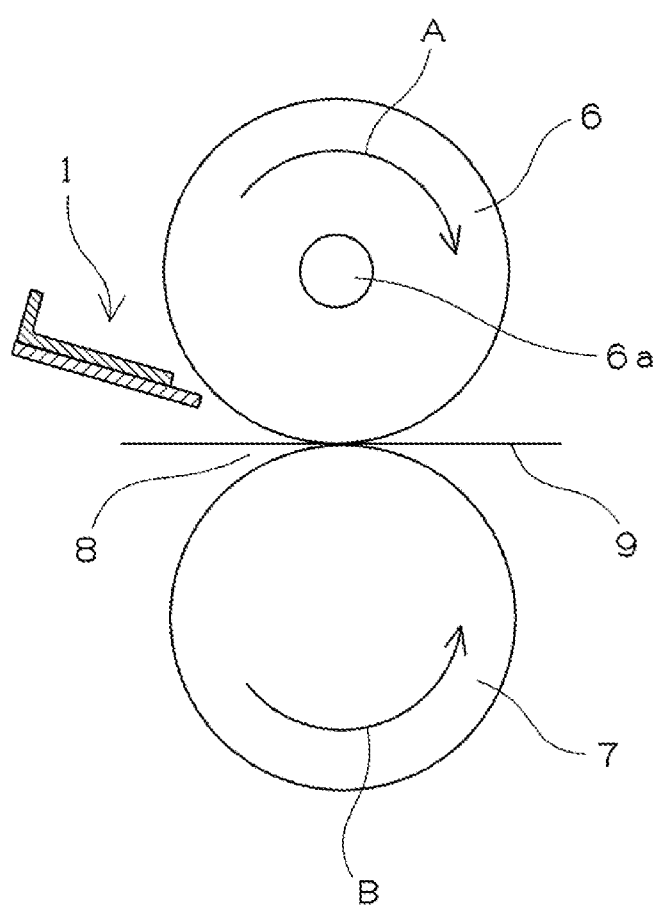
FIG. 8 is a schematic view of a fixing device using the peeling member.

A fixing device using the peeling member manufactured by the manufacturing method or the manufacturing device of the present invention is described with reference to FIG. 8. FIG. 8 is a schematic view of a heat roller type fixing device using a peeling member. The fixing device is provided with a fixing roller 6 in which a heater 6*a* is installed, the fixing roller 6 rotated in a direction of an arrow A, a pressing roller 7 rotated in a direction of an arrow B while contacting with the fixing roller 6, and the peeling member 1 arranged adjacent to a nip portion 8 formed when the fixing roller 6 and the pressing roller 7 are contacted with each other. A toner image formed on a paper 9 is fixed at the nip portion 8 and turned into a fixed image. In order to peel the paper 9 passed through the nip portion 8 from fixing roller 6, the peeling member 1 is arranged to be contacted with or to be close to the fixing roller 6.

Figure 9:
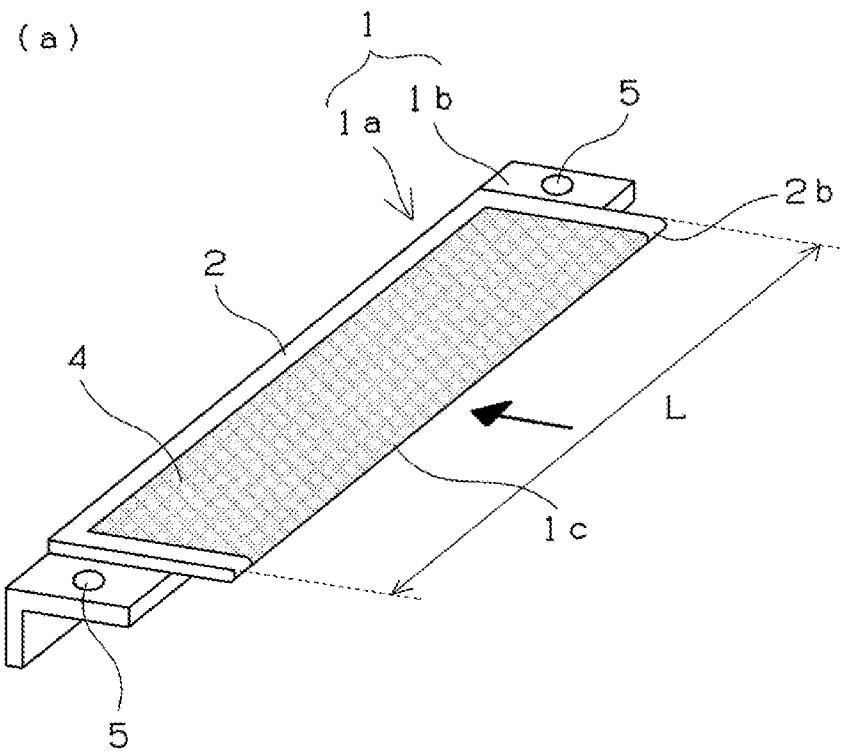
FIGS. 9(a) and 9(b) are a perspective view and an enlarged view of a part of the peeling member illustrating one example of the peeling member.
Figure 9:
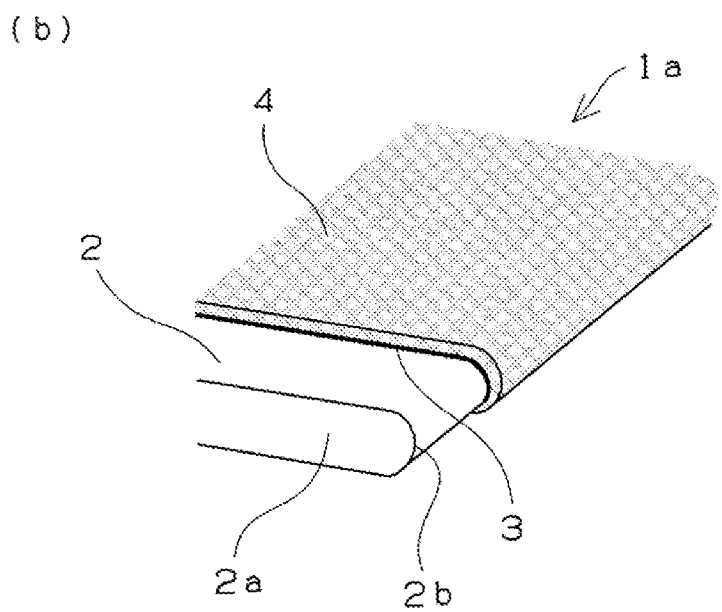

One example of the peeling member manufactured by the manufacturing method or the manufacturing device of the present invention is described with reference to FIGS. 9(*a*) and 9(*b*). FIG. 9(*a*) is a perspective view of the peeling member, and FIG. 9(*b*) is an enlarged perspective view of a part of the peeing sheet. As shown in FIG. 9(*a*), the peeling member 1 is provided with a peeling sheet 1*a*, and a support member 1*b* that supports and fixes the peeling sheet 1*a*. The peeling sheet 1*a* is formed by sticking the non-adhesive resin film 4 on the base material 2 having a substantially rectangular shape in a plane view. A black arrow in the figure indicates a paper passing direction, and a longitudinal direction of the peeling sheet 1*a* is orthogonal to the paper passing direction. In the peeling sheet 1*a* and the base material 2, a paper passing side surface is opposite to a surface supported and fixed by the support member 1*b*. A distal end portion 1*c*, which is an end portion at an upstream side in the paper passing direction of the peeling sheet 1*a* of the peeling member 1, is arranged to be close to the fixing roller so that the distal end portion 1*c* scoops the end portion of a paper peeled from the fixing roller (see FIG. 8).

As shown in FIG. 9(*b*), the non-adhesive resin film 4 is stuck on the surface of the base material 2 via the adhesive layer 3. The non-adhesive resin film 4 is folded and stuck on both of front and rear surfaces of the base material 2 so as to cover (wrap) the distal end edge 2*b* of the distal end portion 2*a* of the base material 2 by the manufacturing device described above. The non-adhesive resin film 4 can prevent the developing agent such as toner from sticking when the developing agent is slid on the non-adhesive resin film 4 in a melting state.

The distal end portion 2*a* of the base material 2 is, for example, a part having a width of 4 mm from the distal end edge 2*b* toward a downstream side in the paper passing direction. The distal end portion 2*a* of the base material 2 defines a distal end portion 1*c* of the peeling sheet 1*a*. Further, the peeling sheet is formed to peel a paper by arranging the distal end portion so as to be contact with or close to the fixing member, and therefore the distal end portion 1*c* of the peeling sheet 1*a* is defined as an end portion at the upstream side in the paper passing direction and "the distal end edge 2*b*" described above is defined as the most distal end point (fixing member side) in the distal end portion 2a of the base material 2.

A recessed shape or a pattern may be formed on the surface of the peeling sheet 1a as needed. The shape thereof is not especially limited as long as a contact area is obtained to such an extent that a paper is not stuck, and therefore a straight linear shape along the paper passing direction, a straight linear shape along a certain direction inclined against the paper passing direction, a curved linear shape curved along the paper passing direction, or any shapes separately arranged at regular intervals or irregular intervals (geometric pattern or the like) may be adopted. Especially, linear grooves along a certain direction inclined against the paper passing direction and arranged at regular intervals are preferable. By adopting such a recessed shape, sticking of a paper right after fixing is easily prevented, and image deterioration such as unevenness, a stripe of an image can be prevented.

The material of the base material 2 is not especially limited as long as the distal end portion of the peeling sheet can be arranged to be contacted with or close to the fixing member, and therefore a metal material or a resin material may be adopted. As the metal material, for example, iron, aluminum, copper, stainless steel or the like may be adopted. Especially, stainless steel is preferable because stainless steel is not rust and stainless steel is easily processed and low in cost. As the resin material, for example, a liquid crystal resin, a polyphenylene sulfide resin, a polysulfone resin, a polyamide resin, a polyether sulfon resin, a polyether-imide resin, a polyether ether ketone resin, an aromatic polyester resin or the like may be adopted. In a case in which the resin material is used, a resin plate that forms the base material can be formed by the resin material by means of injection molding or extrusion molding.

A plate thickness of the metal plate or the resin plate as the base material 2 is preferably set in a range between 50 μm and 300 μm. In a case in which the plate thickness is less than 50 μm, peeling force might not be secured, or the base material 2 might be deformed in jamming. In a case in which the plate thickness exceeds 300 μm, a paper to be peeled is abutted against the distal end portion of the peeling sheet and thereby jamming might occur. Further, the base material 2 has a contact width L (see FIG. 9(a)) that is substantially the same as a length of the roller in an axial direction. With the contact width being large, contact pressure per unit area against the roller becomes small and therefore local wear of a surface of the roller can be prevented. Further, the length substantially the same as the length of the roller in the axial direction means the length that achieves the effect described above, and specifically the length may be more than substantially half of the length of the roller in the axial direction up to the same as or slightly longer than the length of the roller in the axial direction.

As shown in FIG. 9(b), it is preferable that the distal end portion 2a of the base material 2 at the upstream side in the paper passing direction is formed in a curved surface without an edge in a thickness direction. Since the end portion is formed in a curved surface in the thickness direction, even if the end portion is contacted with the fixing member such as the fixing roller and the fixing belt in a pressing contact state with more than certain pressure, the surface of the fixing member is not damaged. Further, the non-adhesive resin film can be prevented from being damaged when the non-adhesive resin film is stuck by using the rollers in the film sticking step described above. In a case in which the base material 2 is formed of a metal plate, the curved surface may be formed by means of machining after the metal plate is formed in a predetermined shape, however it is preferable that the curved surface is formed by means of press cutting that can perform the cutting and the press forming simultaneously.

As shown in FIG. 9(a), the support member 1b is formed as a thick plate, and the holes 5 used for fixing the peeling member to a fixing device body or the like are formed at a left side and a right side in a longitudinal direction of the support member 1b. The material similar to the base material 2 may be adopted as the material of the support member 1b. It is preferable to set a plate thickness of the thick plate that forms the support member 1b to 0.8 mm or more in order to secure strength sufficiently for attaching the base material 2.

A fixing method for the base material 2 and the support member 1b is not especially limited. In a case in which the base material 2 is formed of a metal plate and the support member 1b is formed of a metal thick plate, the base material 2 and the support member 1b are connected to each other by means of welding or the like. In a case in which welding is adopted to connect the base material 2 and the support member 1b, in order to prevent horizontal accuracy of the distal end portion 2a from being deteriorated due to a shape change of the base material 2, it is preferable to connect the base material 2 and the support member 1b by using laser spot welding in which spot portions are arranged parallel to the longitudinal direction. It is preferable that welding marks of the laser spot welding are arranged parallel to a side of the distal end portion of the peeling sheet in order to suppress generation of a waving phenomenon in the base material. Further, it is preferable that an interval between the laser spot welding marks is set to be narrow to such an extent that the laser spot welding can be performed. Specifically, in a case in which the peeling member has a length in the longitudinal direction of approximately 300 mm, it is preferable that the interval between the laser spot welding marks is set to approximately 10 mm.

The non-adhesive resin film 4 is formed by a resin film having non-adhesiveness that can prevent adhering of the developing agent, and for example, a polyethylene resin film, a polypropylene resin film, and a film formed of well-known fluororesin such as a polytetrafluoroethylene (PTFE) resin, a tetrafluoroethylene-perfluoro alkyl vinyl ether copolymer (PFA) resin, a tetrafluoroethylene-hexafluoropropylene copolymer (FEP) resin, a tetrafluoro-ethylene-ethylene copolymer (ETFE) resin, a polychlorotri-fluoroethylene resin, a chlorotrifluoroethylene-ethylene copolymer resin, a polyvinylidene fluoride resin, and a polyvinyl fluoride resin can be used. Especially, a fluororesin film formed of the PTFE resin, the PFA resin, the FEP resin, or the ETFE resin has excellent non-adhesiveness against color toner (toner using polyester binder resin or the like) and also has sufficient heat resistance. Further, the non-adhesive resin film may be formed of non-adhesive resin to which carbon fine powder such as Ketjen black and acetylene black is added as long as the non-adhesiveness against toner is secured, and this configuration can prevent deterioration of paper peeling performance due to static electricity.

A thickness of the non-adhesive resin film such as a fluororesin film is preferably set in a range between 10 μm and 200 μm, and more preferably set in a range between 40 μm and 80 μm. In a case in which the thickness is less than 10 μm, the non-adhesive resin film might be torn in forming the recessed grooves or the distal end portion of the metal plate might be exposed due to slight wear after adhering. Further, a crinkle is easily generated in a film sticking step, and therefore handling performance is deteriorated. In a case in which the thickness is more than 200 μm, the paper peeling performance might be deteriorated.

As described above, the sticking of the non-adhesive resin film 4 to the base material 2 is performed by interposing the adhesive on the stuck surface. That is, the adhesive layer 3 is interposed between the base material 2 and the non-adhesive resin film 4. Especially, a silicon adhesive is preferable as the adhesive agent. Example of the silicon adhesive includes an adhesive obtained by condensing copolymer formed by a $SiO_2$ unit and a $(CH_3)_3SiO$ unit, and diorganopolysiloxane raw rubber. By interposing the silicon adhesive, the non-adhesive resin film is firmly adhered to the base material, and a sticking effect can be maintained in a fixing temperature, and a cushioning effect caused by the adhesive can be expected. In addition, it is preferable to apply surface treatment such as corona discharge treatment, sputter etching treatment, plasma etching treatment, TOS treatment by metallic sodium, ultraviolet irradiation treatment to the stuck surface toward the metal slate in order to enhance the adhering effect.

A thickness of a silicon adhesive layer is preferably set in a range between 5 and 50 μm. In a case in which the thickness is less than 5 μm, the adhering effect might not be obtained sufficiently. Further, in a case in which the thickness is more than 50 μm, paper peeling performance might be deteriorated because a thickness of the whole of the peeing member becomes relatively large.

In the peeling member 1, the non-adhesive resin film 4 is stuck to the base material 2 so as to wrap the distal end edge 2b of the base material 2. The non-adhesive resin film 4 is stuck in a range slightly shorter than a length in the longitudinal direction of the base material 2. Thus, a base metal or the like of the base material is exposed at the both end surfaces in the longitudinal direction. Further, since the both end portions in the longitudinal direction of the non-adhesive resin film 4 are not pulled in sticking, even if the adhesive force is uneven or the adhesive force is deteriorated after sticking, the non-adhesive resin film 4 is not contracted and therefore the adhesive layer 3 is not exposed. Further, the peeling member 1 can be linearly contacted with the fixing roller sufficiently, and the fixing member such as the fixing roller is not damaged at the contact portion, and therefore excellent peeling performance can be maintained for a long period of time.

INDUSTRIAL APPLICABILITY

The manufacturing method and the manufacturing device for the peeling member of the present invention can suppress generation of a crinkle or an air bubble in the resin film stuck to the base material in the manufacturing process, and therefore both of the front and rear surfaces of the peeling member are excellent in smoothness. Accordingly, the present invention can be applied as the manufacturing device for the peeling member that can ensure quality of a record image at a high level.

REFERENCE SIGNS LIST

1: peeling member
2: base material
3: adhesive layer
4: non-adhesive resin film
5: hole
6: fixing roller
7: pressing roller
8: nip portion
9: paper
10: base
11: carrier sheet
12: cutting jig
20: roller device
21 to 25: roller
26: linear guide

The invention claimed is:

1. A manufacturing method for a peeling member, the peeling member comprising a peeling sheet formed by a base material formed of a metal plate or a resin plate and a non-adhesive resin film stuck to the base material, the peeling member being configured to peel a paper from a fixing member of an electronic photographic device by making a distal end portion of the peeling sheet, which is an end portion of a long side of the peeling sheet at an upstream side in a paper passing direction, contact with or close to the fixing member, the manufacturing method for the peeling member comprising sticking the non-adhesive resin film, which has an adhesive layer on a surface at a side opposite to a paper passing side, to a distal end portion of the base material corresponding to the distal end portion of the peeling sheet, wherein, in sticking the non-adhesive resin film, a distal end edge of the distal end portion of the base material is arranged at a side of the adhesive layer of the non-adhesive resin film such that the end portion of the non-adhesive resin film is protruded from the distal end edge, and then the non-adhesive resin film is stuck on both surfaces of the distal end portion of the base material to wrap the distal end edge of the base material by pressing a plurality of rollers sequentially onto the non-adhesive resin film from an one side end portion toward an another side end portion in a longitudinal direction of the base material;

the rollers are sequentially arranged along a moving direction of the rollers moved relatively to the base material by a moving unit.

2. The manufacturing method for the peeling member according to claim 1, wherein, in sticking the non-adhesive resin film, first to fifth rollers provided as the rollers are sequentially used to perform that (1) the first roller folds the non-adhesive resin film at an angle equal to or more than 10° and less than 50° against a surface of the base material, (2) the second roller folds the non-adhesive resin film at an angle equal to or more than 50° and less than 85° against the surface of the base material, (3) the third roller folds the non-adhesive resin film at an angle equal to or more than 100° and less than 165° against the surface of the base material to wrap the distal end edge of the base material, and (4) the fourth roller and the fifth roller interpose the distal end portion of the base material between them so that the non-adhesive resin film is stuck on the both surfaces of the distal end portion of the base material.

3. The manufacturing method for the peeling member according to claim 1, wherein each of the rollers comprises a roller body and a roller shaft that supports the roller body in a rolling manner, and the roller body is formed of a rubber material, a foaming material, or a resin material.

4. The manufacturing method for the peeling member according to claim 3, wherein the hardness of the roller body is set in a range between the Shore A10 hardness and the Shore A90 hardness.

5. A manufacturing device for a peeling member, the peeling member comprising a peeling sheet formed by a base material formed of a metal plate or a resin plate and a non-adhesive resin film stuck to the base material, the peeling member being configured to peel a paper from a fixing member of an electronic photographic device by making a distal end portion of the peeling sheet, which is an end portion of a long side of the peeling sheet at an upstream side in a paper passing direction, contact with or close to the fixing member, the manufacturing device comprising a film sticking unit that sticks the non-adhesive resin film, which includes an adhesive layer on a surface at a side opposite to a paper passing side, to a distal end portion of the base material corresponding to the distal end portion of the peeling sheet, wherein:
the film sticking unit comprises a plurality of rollers and a moving unit that moves the rollers relatively to the base material;

the moving unit is configured to move the rollers relatively to the base material, which has the non-adhesive resin film stuck on one surface of the base material via an adhesive layer such that an end portion of the non-adhesive resin film is protruded from a distal end edge of the distal end portion of the base material, from an one side end portion toward an another side end portion in a longitudinal direction of the base material;

the rollers are sequentially arranged along a moving direction of the rollers moved by the moving unit, and the rollers comprises a plurality of the rollers for folding arranged to be inclined such that angles of surfaces of the rollers against the one surface of the base material are set to be gradually larger from an upstream side in the moving direction and a pair of the rollers for finishing arranged to interpose the base material from both surface sides and to follow a plurality of the rollers for folding; and the manufacturing device for the peeling member is configured to use the moving unit to stick the non-adhesive resin film on both surfaces of the distal end portion of the base material to wrap a distal end edge of the base material by pressing the rollers for folding sequentially onto the non-adhesive resin film and interposing the base material from both surface sides by the rollers for finishing.

6. The manufacturing device for the peeling member according to claim 5, wherein:
the film sticking unit comprises first to third rollers as the rollers for folding, and fourth and fifth rollers as the rollers for finishing; and in a section orthogonal to the moving direction of the rollers moved by the moving unit, the first roller is inclined at an angle equal to or more than 10° and less than 50°, the second roller is inclined at an angle equal to or more than 50° and less than 85°, and the third roller is inclined at an angle equal to or more than 100° and less than 165° against the one surface of the base material, and the fourth and fifth rollers are parallel to the surface of the base material.

7. The manufacturing device for the peeling member according to claim 5, wherein each of the rollers comprises a roller body and a roller shaft that supports the roller body in a rolling manner, and the roller body is formed of a rubber material, a foaming material, or a resin material.

8. The manufacturing device for the peeling member according to claim 7, wherein the hardness of the roller body is set in a range between the Shore A10 hardness and the Shore A90 hardness.

\* \* \* \* \*